US011922415B2

(12) United States Patent
Andon et al.

(10) Patent No.: US 11,922,415 B2
(45) Date of Patent: Mar. 5, 2024

(54) CRYPTOGRAPHIC DIGITAL ASSET ARCHITECTURE WITH SELECTIVELY-LOCKABLE DYNAMIC EVOLUTION

(71) Applicant: NIKE, Inc., Beaverton, OR (US)

(72) Inventors: Christopher Andon, Portland, OR (US); Nikhil Gopalani, Dublin, OH (US); Chris Le Howard, Salt Lake City, UT (US); Samuel Lespes, Dubai (AE); Benoit Pagotto, Paris (FR); Steven Vasilev, Miami, FL (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/305,308

(22) Filed: Apr. 21, 2023

(65) Prior Publication Data
US 2023/0342767 A1    Oct. 26, 2023

Related U.S. Application Data

(60) Provisional application No. 63/334,082, filed on Apr. 22, 2022.

(51) Int. Cl.
*G06Q 20/38*    (2012.01)
*G06Q 20/36*    (2012.01)

(52) U.S. Cl.
CPC ....... *G06Q 20/389* (2013.01); *G06Q 20/3672* (2013.01); *G06Q 20/3825* (2013.01)

(58) Field of Classification Search
CPC ............. G06Q 20/389; G06Q 20/3672; G06Q 20/3825
See application file for complete search history.

(56) References Cited

U.S. PATENT DOCUMENTS

| 10,505,726 | B1 | 12/2019 | Andon et al. |
| 11,295,318 | B2 | 4/2022 | Andon et al. |
| 11,308,184 | B2 | 4/2022 | Andon et al. |
| 11,379,429 | B1 * | 7/2022 | Lupowitz .............. G06F 16/256 |

(Continued)

OTHER PUBLICATIONS

Finzer, Devin: "The Non-Fungible Token Bible: Everything you need to know about NFTs", OpenSea Blog, Sections 1-3, Jan. 10, 2020, https://opensea.io/blog/articles/non-fungible-tokens.

*Primary Examiner* — Patrick McAtee
*Assistant Examiner* — Vincent I Idiake
(74) *Attorney, Agent, or Firm* — Quinn IP Law

(57) ABSTRACT

A method of selectively locking a cryptographic digital asset includes instructing or requesting the creation or minting of a plurality of cryptographic tokens via a first common digital contract registered to a distributed ledger. Each cryptographic token is a digital asset that includes at least one attribute that is operative to evolve or change through a plurality of evolutionary stages. The plurality of cryptographic tokens are then instructed to be transferred to a plurality of token holders. The method further includes receiving a request from a token holder to selectively lock their digital asset at one of the plurality of evolutionary stages; and instructing or requesting the transfer of a second cryptographic token to the token holder, the second cryptographic token having at least one attribute that is at least partially derived from the evolutionary stage of the digital asset at the time of the request.

20 Claims, 7 Drawing Sheets

(56) References Cited

U.S. PATENT DOCUMENTS

| | | |
|---|---|---|
| 11,475,449 B2 | 10/2022 | Andon et al. |
| 11,488,265 B1 * | 11/2022 | Jain ................... H04L 63/0807 |
| 11,588,748 B1 * | 2/2023 | Dehenre ................ H04L 47/72 |
| 2022/0391895 A1 * | 12/2022 | Weber ................ G06Q 20/3823 |
| 2023/0196341 A1 * | 6/2023 | Quigley ............ G06Q 30/0185 |
| | | 705/65 |

* cited by examiner

CRYPTOGRAPHIC DIGITAL ASSET ARCHITECTURE WITH SELECTIVELY-LOCKABLE DYNAMIC EVOLUTION

CROSS REFERENCE TO RELATED APPLICATIONS

The present application claims the benefit of priority from U.S. Provisional Patent Application No. 63/334,082, filed on 22 Apr. 2022, which is incorporated by reference in its entirety.

TECHNICAL FIELD

The present disclosure generally relates to an architecture and method that allows a user to interact with and selectively freeze a dynamically evolving cryptographic asset/digital collectable.

BACKGROUND

A non-fungible token (NFT) is a non-interchangeable (i.e., non-fungible) record that is digitally stored and is capable of being sold or traded between different market participants. In many instances, an NFT can serve as a digital certificate of authenticity or proof of ownership in a corresponding digital or physical item. The records comprising the NFT are often stored in/on an immutable digital ledger, such as a blockchain-style ledger, which can be broken up across many different nodes or ledger-maintaining participants. Such blockchain ledgers will use some means of cryptology to encode at least a portion of the contents of the record, while also referencing the prior block (in the chain of blocks) to provide continuity.

NFTs typically include resident data (metadata) stored directly on the blockchain that defines the core aspects of the digital asset. Due to cost complexities associated with pushing large quantities of data through the blockchain transaction validation process, the metadata itself may be limited, but may often include one or more pointers or references to additional separate on-chain stored assets or off-chain data/digital files such as photos, graphics, videos, and/or audio that would be cost-prohibitive to store on-chain. When the NFT is displayed, such as on a user's social media account or in a user's digital wallet, an associated software program may review the metadata, and then digitally retrieve the associated photo from the referenced on-chain or off-chain file repository for display.

Two blockchain/smart contract standards have come to dominate the current NFT space. Both rely on the Ethereum network, and are set forth according to community adopted Improvement Proposals: ERC721 (also referred to as EIP-721); and ERC1155 (also referred to as EIP-1155). In a very general sense, ERC 721 provides a standard for creating unique (i.e., 1 of 1) digital assets, and are most commonly associated with traditional NFTs. Each ERC721 token includes a token-specific smart contract and must be minted and transferred independently from any other ERC721 token. Conversely, ERC1155 provides a standard for batch creating a plurality of substantially identical tokens through a single recorded smart contract. These batch-created tokens are serialized (e.g., token 1 of 100) and can be transferred between wallets individually or in bulk.

Examples of assets that may be represented via ERC721 tokens include unique assets, such as land, artwork, unique digital collectables, and the like. Examples of assets that may be represented via ERC1155 tokens include, for example, limited run trading cards, art prints, coupons, and general admission event tickets. Upon creation, each tokenized asset under an ERC1155 contract is substantially interchangeable with any other commonly minted asset under that contract. For example, an ERC1155 contract may be used to batch-mint 100 outwardly identical trading cards that are perfectly interchangeable with each other (except for having unique token identification (ID) numbers). From an owner's perspective, a plurality of such cards may be collectively transacted via a single marketplace listing, where the value of any individual card is dictated by the market dynamics of the lot rather than any trait of an individual card/token.

In some embodiments, the ERC1155 contract may further provide a toggling mechanism to transition the token from an initial fungible/semi-fungible state to a subsequent non-fungible state. Such may be utilized in connection with general admission event tickets or coupons, where upon use, the token loses its interchangeability with other tokens of the initial lot and takes on a more unique/non-fungible existence.

For the purposes of this disclosure, ERC721 tokens may more generally be referred to as unique cryptographic tokens ("UCTs"), whereas ERC1155 tokens may be referred to as batch-minted cryptographic tokens ("BMCTs"). Each UCT may be independently registered to a blockchain distributed ledger and may be the product of a separate smart contract or multiple UCTs may be minted from the same smart contract. A plurality of BMCTs may all be collectively derived from a single smart contract registered to a blockchain distributed ledger. Broadly speaking, both UCTs and BMCTs are to be regarded for the purpose of this disclosure as types of NFTs.

In the current market, most digital collectibles backed by UCTs or BMCTs are substantially static in nature and derive value both from the desirability of the collection to which the collectable belongs, as well as from the rarity of one or more asset-specific traits that are expressed in the token and/or referenced graphics file. In the current NFT landscape, there is little opportunity to engage with the digital collectable beyond loading the graphics file as a profile picture on social media or importing the collectable/asset into a third-party software application, where it may be "used" by a character or employed to influence gameplay functionality.

DETAILED DESCRIPTION

Broadly speaking, the concepts described herein provide for an enhanced degree of interactivity and user participation in connection with digital collectibles and NFTs. Under this architecture/method, a limited run of dynamic digital collectables may be batch minted, after which owners/holders of those collectibles may be given the option and/or ability to selectively lock their copy of the collectable at any stage in its dynamic evolution. In some embodiments, depending on when the asset is locked, different downstream opportunities/benefits/abilities may follow.

By enabling direct user participation and control over an evolving digital asset, the present technology can provide for a more actively engaged ownership community, which can create more enjoyable user experiences and increase the desirability of asset ownership and brand engagement.

Figure 1:
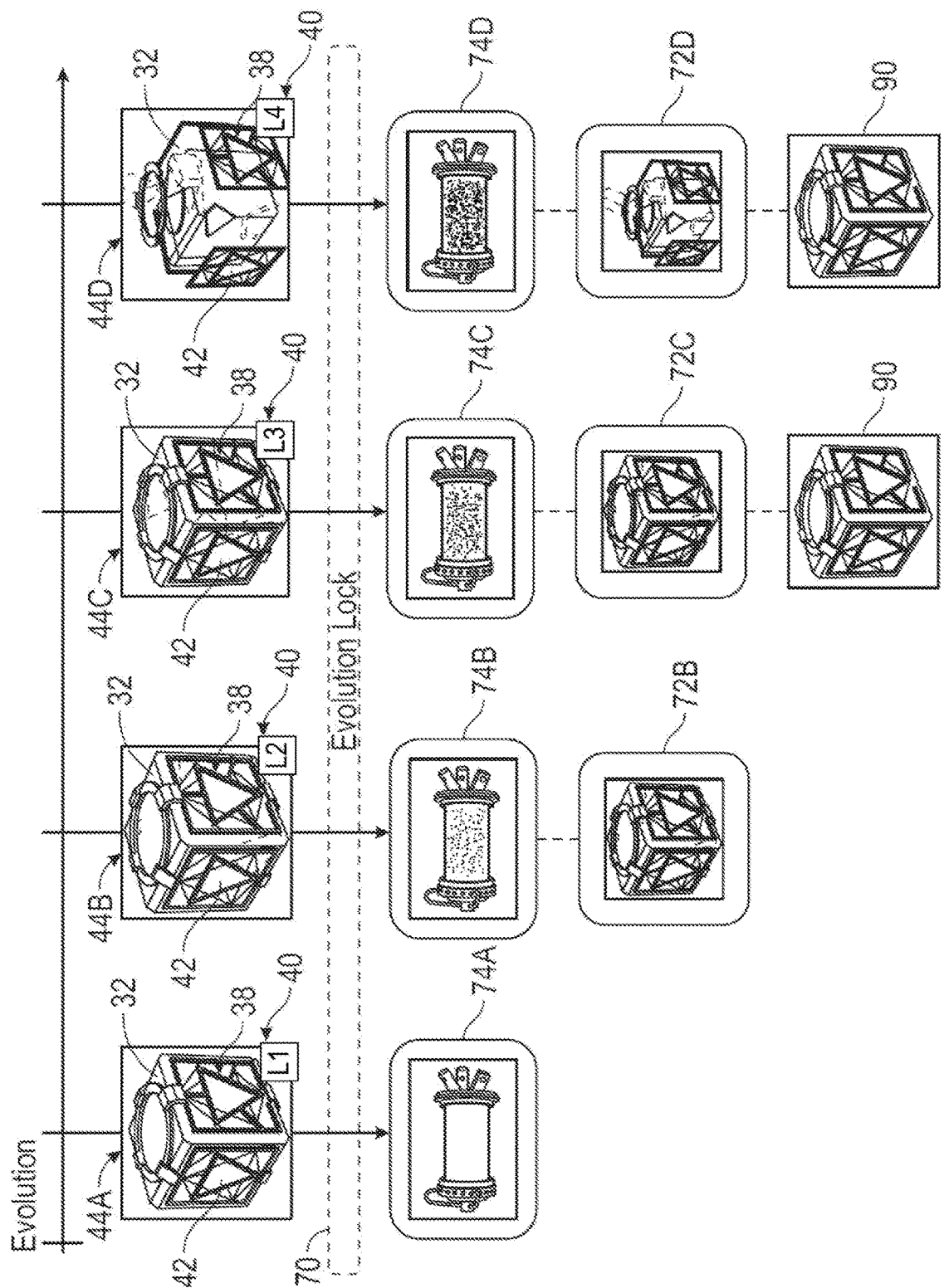
FIG. 1 is a schematic timeline progression of the evolution-dependent locking of a cryptographic digital asset.

The present method begins via the batch creation and/or batch minting of a plurality of cryptographic tokens (BMCTs) via a single/common digital contract registered to a blockchain-style distributed ledger (i.e., a "smart contract," such as for example an ERC1155 contract). At the point of minting, each cryptographic token/associated digital asset may be substantially identical to all others except for a varying token-specific ID number. The smart contract and/or BMCT may include metadata that makes reference to an on-chain or off-chain file repository that contains one or more data files and/or graphics files stored thereon. The file repository may be an internet connected server, a cloud based computing platform, or a peer-to-peer/distributed file system such as the InterPlanetary File System (IPFS), developed by Protocol Labs. The identified graphics file stored on the file repository may provide a graphical representation of the digital asset 32 (as shown in FIG. 1) that may be common to each BMCT minted via the registered smart contract. Once created, the BMCT's may distributed to a plurality of different token holders, such as by requesting or instructing the transfer via the established blockchain protocols.

Figure 2:
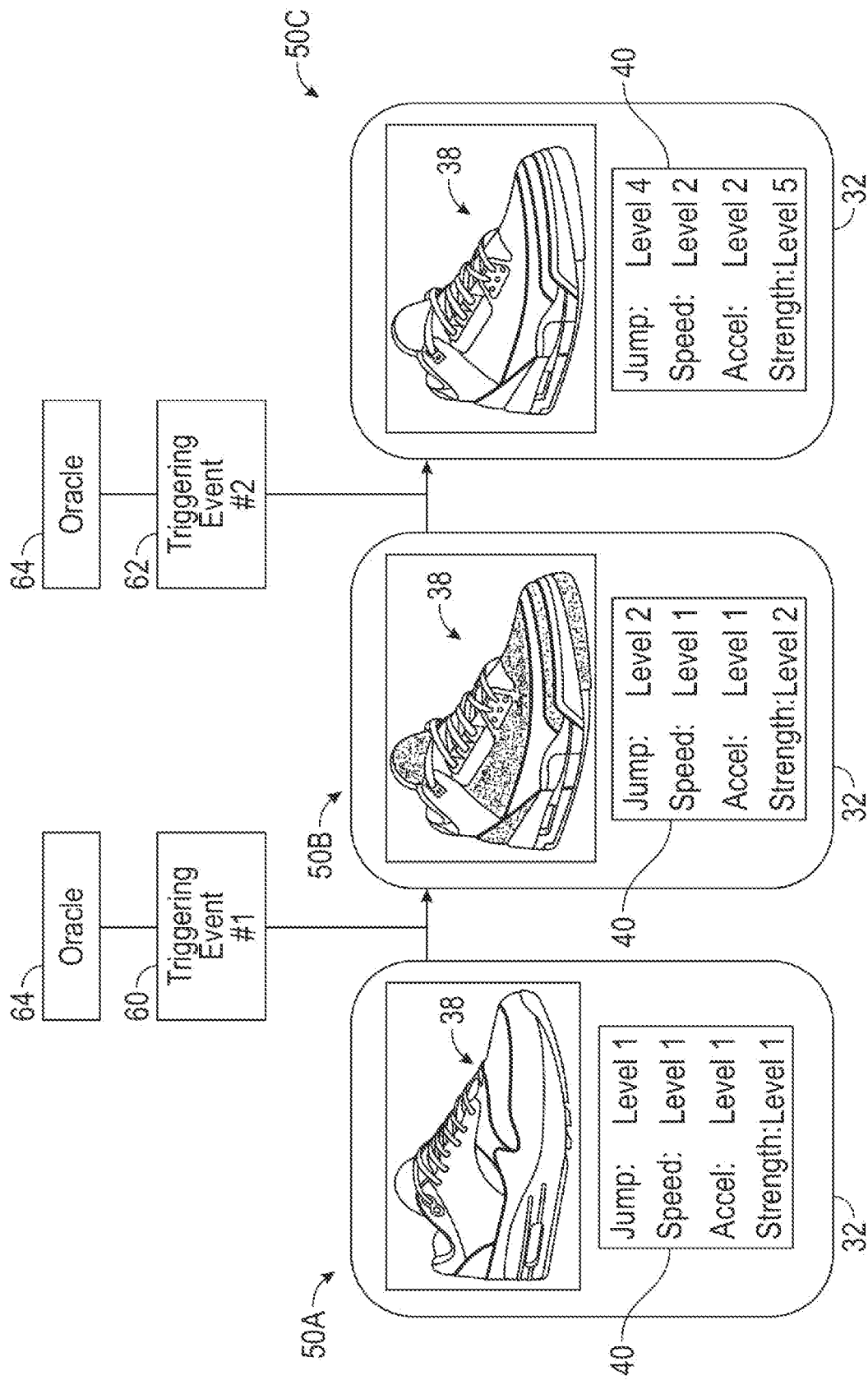
FIG. 2 is a schematic evolution progression for a cryptographic digital asset that evolves via one or more external triggering events.

As generally shown in FIGS. 1-2, the digital asset 32 may include at least one trait/attribute is configured to dynamically evolve through a plurality of evolutionary stages over some period of time and/or in response to one or more events. These dynamically evolving traits can take various forms and/or can be implemented in a variety of different ways. For example, in some configurations, the trait may be a visual element 38 of the digital asset, while in others the evolving trait may include a non-visual parameter 40 such a performance attribute that defines how the digital object performs or influences other objects if/when the asset is imported into a video game-type software application.

In embodiments where the evolving attribute is a visual element 38 of the digital asset, the visual element may comprise the full graphical representation of the digital asset (the "image"), a portion of the image, a layer of the image, or even one or more elements that get added to the image only after a conditional event occurs. Examples of potentially evolving graphical attributes include, for example, colors, graphical stickers, embellishments, attribute size(s), visual continuity, backgrounds, textual identifiers, state identifiers, and the like.

If the dynamically evolving trait is an element of the graphical representation of the asset and/or the graphics file, the alteration of this integrated visual element may require either a modification of a pointer to the graphics file (i.e., thus causing the token to direct to a different file or file location), or else the original source file may simply be replaced on the file repository. In some embodiments, to identify the evolutionary state of the dynamic trait more easily, a digital record of the evolution and/or nature of the evolving trait may be stored in conjunction with graphics file. This digital record may be provided, for example, in a companion data file, in metadata associated with the graphics file, or even in a digital code provided within the image itself (e.g., a QR code represented on the graphic).

In embodiments where the evolving attribute is a non-visual parameter 40, the attribute may comprise a discrete alphanumeric identifier (e.g., level 1 (L1), level 2 (L2), level 3 (L3), level 4 (L4), etc.) that may serve as a qualitative or quantitative identifier of the magnitude of some trait, such as level, experience, power, or stage of evolution, event ID, etc. This dynamically evolving trait or attribute may be stored in a data file on the file repository, possibly in conjunction with a graphics file that is illustrative of the digital asset. Such a data file, for example, may define one or more performance attributes that define how the digital object performs or influences other objects if/when the asset is imported into a video game-type software application. Examples of such parameters may include, for example, strength, agility, health, level, or power boost. The dynamic evolution of the asset may serve to either randomly alter one or more of these parameters or may only serve to increase/level up one or more of these parameters.

While in many embodiments, the dynamic attribute may be an integrated aspect of the BMCT (i.e., by being indivisible from or else directly identified within the data or graphics associated with the BMCT), in other embodiments, the dynamic attribute may be its own discrete sub asset that is simply referenced by the primary digital asset/BMCT. More specifically, in some configurations, the evolving attribute may have its own tokenized existence that is identified within or referenced by the BMCT. In such a nested architecture, any evolutionary changes in the evolving attribute may occur within the code or control of only this second-layer attribute token. Further disclosure of this nested-attribute concept can be found in U.S. patent application Ser. No. 17/701,237, filed 22 Mar. 2022, issued as U.S. Pat. No. 11,475,449, which is incorporated herein by reference in its entirety and for all purposes.

FIG. 1 schematically illustrates one example of a digital asset 32 that is represented as a cuboid container having an outer surface 42 configured to dynamically evolve from a substantially intact initial state 44A, through a progression of subsequent evolution states 44B, 44C, 44D that progressively decompose and/or breaks apart. In this embodiment, the evolving visual attribute 38 is the visual continuity/integrity of the outer container structure. Moreover, this example also provides a non-visual parameter 40 (i.e., evolutionary level) that accompanies the asset 32 and evolves simultaneously with the progressive degradation of the visual outer surface 42.

FIG. 2 schematically illustrates a second example of a digital asset 32 that is represented as a shoe image (a visual attribute 38) that is configured to dynamically evolve through a progression of evolutionary stages 50A, 50B, 50C. As further illustrated, the digital asset includes a plurality of non-visual parameters 40 that are also configured to evolve from stage to stage. As shown, these non-visual parameters 40 may include attributes that qualitatively define how the respective asset performs when imported into a digital video game-style environment and worn by a user's avatar.

Attribute Evolution

Once the BMCTs are defined and minted, the one or more dynamic attributes may evolve either in a discrete or continuous manner across time. In discrete or piecewise evolution, the attribute would progress through a plurality of perceivably distinguishable evolutionary stages where the transitions are recognizable and each stage is maintained for some appreciable period of time (e.g., days/weeks). In a continuous evolution, the attribute would progress through a multitude of sufficiently small changes where any two temporally adjacent states would be nearly indistinguishable in isolation (i.e., the total transition more closely resembles a gradual morphing). In practice, due to the limitations of modern computing, the difference between discrete and continuous may simply be a matter of degree, where a discrete evolution has less than 1000, or less than 100, or less than 50, or less than 10 discrete evolutionary stages, whereas a continuous evolution may have more than 1000, or more than 5000, or more than 10000, or even more than 100000 discrete stages. Examples of a discrete evolution are shown in FIGS. 1 and 2. Other examples may involve incrementing an experience level of the asset by integer values from 0 to 50 or cycling the color of a visual attribute through the seven main colors of the rainbow. Conversely, examples of a continuous evolution may involve incrementing the experience level every second or minute of the token's existence (since minting) or cycling the color of a visual attribute through the colors of the rainbow in 5000 or more increments (as opposed to just 7 in the discrete example).

In general, the evolution of the dynamic attribute may occur in response to some predefined event, occurrence, condition, or action. In some configurations, the condition may simply be the passage of time (e.g., where the transition occurs in response to the incrementing of a clock, a new block being added to the blockchain, or the like). In other configurations, the condition may be a random number generator outputting a number within a pre-defined range or a particular function outputting some predefined result or sequence. In still other configurations, the evolution may come at the discretion of an asset administrator (e.g., by the administrator replacing a file on the file server).

Figure 3:
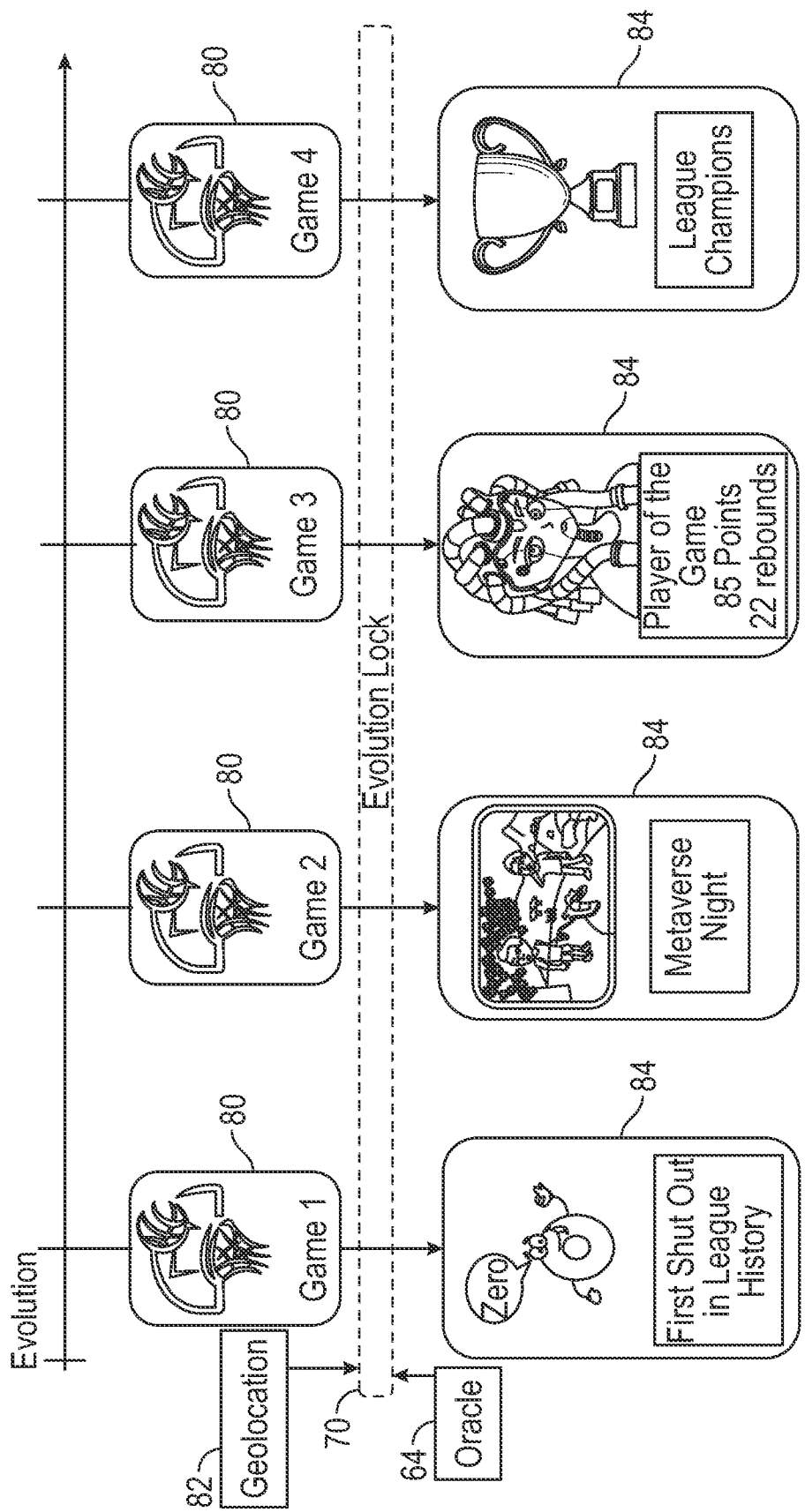
FIG. 3 is a schematic evolution progression for a cryptographic digital asset that incorporates one or more external factors in facilitating the outcome of the evolution lock.

In some configurations, the dynamic attribute may evolve in direct response to one or more external triggering events (e.g., triggering event #1 60 and triggering event #2 62, as shown in FIG. 3). Such triggering events may be outside of the direct control and/or prediction of the smart contract, and may rely on a suitable import filter, API, or blockchain oracle 64, or other similar mechanism to detect and utilize. In some embodiments, these triggering events may have a probabilistic chance of occurring (e.g., the outcome of a sporting event or playoff/postseason performance, an athlete's in-game statistics or career highlights, outcomes of elections, etc. . . . ) and may transpire in the real/physical world or within a digital/virtual environment or game environment. In some embodiments, a suitable blockchain oracle 64, such as may be provided via the CHAINLINK blockchain protocol, may serve as distributed source of knowledge from which these triggering events may be derived.

The external triggering events that cause the attribute to evolve may further involve the outcome of one or more activities that require (or encourage/incentivize) group/community participation. For example, in one example, the dynamic attribute may evolve in response to a community (e.g., an ownership group for the BMCT asset) completing one or more predefined group challenges. Such an evolution model may aid in fostering a greater sense of engagement and interconnectedness within the ownership base, which can strengthen ownership and brand loyalty. Examples of group challenges may include achieving a predefined total number of social media "likes" for the respective asset, achieving a predefined number of uses/imports of the asset in a social media digital platform or within one or more video game-type software applications, achieving various collective milestones (e.g., asset valuation or rank within a predefined pool of assets), and/or solving one or more particularly challenging puzzles, riddles, cyphers, or the like.

Selective Evolution Lock

As noted above, following the creation of these BMCTs with evolving attributes, holders of the tokens may be provided with a mechanism to selectively freeze the asset in its current state such that further evolution of the dynamic attribute/trait is prevented (as generally represented at 70 in FIG. 1). This act of freezing or locking the evolution may then enable that holder to maintain the asset (or identical replacement) in that locked state indefinitely (e.g., locked/replica locked tokens 72B, 72C, 72D, corresponding to evolution states 44B, 44C, 44D in FIG. 1), or in some embodiments may provide the holder with one or more derivative assets/tokens 74A, 74B, 74C, 74D that are based, at least in part, on the evolutionary state of the BMCT at the time the lock request was made.

In one configuration, such a locking event may occur and/or may be provided for within the standard used to create the token. For example, if one BMCT holder (out of a plurality of BMCT holders under a common contract) wanted to freeze the state of their token, they may toggle a redemption feature that transitions the token from having group-level attributes (i.e., shared in common with a plurality of the other batch minted tokens), to token-specific attributes (i.e., discrete attributes, pointers to graphics files, etc,) that are uniquely identified on a token-by-token basis).

In another embodiment, to selectively lock or freeze the state of an evolving BMCT, a user may selectively exchange the BMCT for one or more unique cryptographic tokens (UCTs) and/or BMCTs that correspond to the exchanged BMCT (i.e., where the UCT and/or BMCT has one or more attributes or properties that are at least partially derived from the state of the evolving BMCT at the moment of the exchange). To facilitate the exchange, a server or computing node may receive a request to facilitate the lock/exchange from the owner or holder of the BMCT. At that point, the server may examine the current parameter space of the evolving BMCT to identify which attributes have evolved since creation and to what degree they have evolved. Such an examination may involve reaching out to the file repository to examine the current state of the graphics file, any metadata associated with the graphics file, and/or other data files that may be associated with or referenced by the evolving BMCT.

Once the parameter space of the evolving BMCT is understood, the server may generate a UCT, such as an ERC721 token, and/or a BMCT, such as an ERC1155 token, that includes at least one parameter or attribute that is partially derived from the state of the evolving attribute in the BMCT at the time of the request. In some embodiments, the UCT may be an exact replica of the BMCT at the time the request-to-lock was made. In other embodiments, the UCT maybe visually different from the graphical representation of the evolving BMCT, though could have one or more aspects that are uniquely derived from the state of the dynamically evolving trait. For example, with the embodiment illustrated in FIG. 1, while the evolving BMCT may be represented as cuboid object, upon exchange, a corresponding UCT digital shoe or BMCT digital skin vial may be created by the server upon exchange. This digital skin vial may be an attribute-modifying sub-asset that may be used to modify a predefined attribute (e.g., colorway, shilouette, embellishments, laces, background, dynamic motion/animation, degree of cartoon rendering, or the like) of a more senior asset such as a silhouette or un-ordained version of a shoe. This digital skin vial may have varying states or design themes that are derived or created as a result of the state of the cube at the time of the request. Likewise, in some embodiments, instead of creating a derivative attribute-modifying sub-asset UCT/BMCT, such as the vial, the server may create a UCT of more senior/primary asset, such as an entire uniquely designed shoe.

In some embodiments, multiple UCTs may be created following the request to exchange/lock. More specifically, the server does not need to stick to a 1:1 creation/exchange model, but rather could generate a plurality of UCTs in response to the request to lock a single evolving BMCT. In one embodiment, the server may create a first UCT that is derived from the evolutionary state of the BMCT at the time of the request (e.g., derivative assets 74A-D), and may also create a second UCT that is a replica of the BMCT at the time of the request (e.g., replica assets 72B-D). The first UCT may be a primary asset (e.g., shoe, article of apparel, gaming tool, accessory or weapon, etc) or a sub asset (color, feature, overlay, special ability, etc), but may derive at least one property/attribute from the evolutionary state of the BMCT at the time of the request.

In some embodiments, the server may further consider various pieces of ancillary data when generating the UCT. For example, the server may rely on data from external sources such as date/time, an oracle (or other repository of real-world data/events/knowledge), geospatial data (e.g., identifying where the request was made), or the existence of other registered assets within the owner's wallet or account (e.g., booster assets). An example of the use of such ancillary data may involve the server generating a sports-themed or commemorative UCT if the request to lock is made while physically present at a championship basketball or football game. Conversely, the server may generate a UCT having differing properties if the request to lock is made elsewhere (despite both requests being made at the same time and evolutionary state of the BMCT asset).

In another example, such as illustrated in FIG. 3, BMCT digital assets 80 may be provided to every season ticket holder within a particular sporting league at the start of the season or post-season. The server may only recognize requests to lock 70 an evolutionary state of the token if the request occurs while in attendance at a game (as recognized by a geolocation input 82). One or more elements of a generated UCT 84 (i.e., generated by the server in response to a request to lock 70) may then correspond to the evolutionary state of the BMCT (i.e., where the dynamically evolving attribute may be a counter used to identify which game in the season or playoffs is currently the "live" game). Further, other properties/attributes of the generated UCT may correspond to significant occurrences at that game (e.g., scoring leader, player milestone, division/conference/league champion, etc) as may be sourced from an external repository of sports knowledge, statistics database, or blockchain oracle 64. Such a "game" of choosing when to exchange the BMCT may involve an element of chance regarding whether to hold out for a better or more notable game in which to lock, or whether the current game presents a compelling reason to make the request/exchange.

Following the receipt of the request to lock and generation of one or more corresponding UCTs, the server may instruct, request, or otherwise cause the transfer of the generated UCTs 84 to a wallet or account of the originally requesting party. In this manner, from the user's perspective, the user may make a request to lock, and then receive one or more corresponding digital collectables in return. In some embodiments, the original BMCT that was requested to be locked may transition to an inactive state (e.g., toggled to a blank graphics file or be designated as "burned" or "redeemed") or else may be transferred to an account or wallet associated with the server or content creator (i.e., where that wallet may exist for the sole purpose of collecting redeemed BMCTs). In this way, the user may effectively exchange their BMCT for one or more UCTs that are based on the BMCT. In still other examples, such as the sporting example above, the original BMCT may not be burned at all if the organizer's intent was to use the BMCT to facilitate giveaways that are targeted to certain classes of ticketholders (e.g., season ticketholders, ticketholders who purchase directly from the team/league rather than from a third-party marketplace, etc). In that case, the request to lock may be made a plurality of times without impacting the underlying BMCT.

Downstream Opportunities

While the UCT, itself, may have some extrinsic value based on its collectability, visual appearance, etc, in some embodiments the UCT may also provide its owner/holder with some intrinsic value by way of unlocking new opportunities or increasing the likelihood that certain opportunities may be made available. For example, in some embodiments, the UCT may be exchanged for one or more physical products, including, but not limited to: physical items having a look, appearance, or likeness that matches or is derived from the graphics file/image associated with the UCT; or physical items of a more generic character (e.g., limited production (about 100-5000 units)). In some embodiments, the UCT may influence an owner's likelihood of receiving secondary benefits, such as varying physical retail product offerings, access to select events or advance-sale ticketing opportunities, digital access to unique experiences within virtual or mixed reality environments, or the ability to receive or purchase varying tertiary digital assets. For example, holding a certain UCT or a UCT having a particular trait may increase your likelihood of winning a virtual draw for a limited release product offering, such as by multiplying the number of entries you have in the draw, increasing a probability of selection, and/or advancing your position within a virtual line. Further disclosure of such draw-based product sales and virtual lines is provided in U.S. Pat. No. 11,295,318, issued on 5 Apr. 2022, which is incorporated by reference in its entirety.

In some embodiments, all UCTs being generated from a common BMCT contract may belong to a common collection of UCTs or be of a common genus of UCTs. As such, opportunities exist to "airdrop" or gift subsequent UCTs to any UCT holder within that collection.

In one embodiment, the method may further include transferring a subsequent dynamically evolving BMCT 90 ($2^{nd}$ generation cube shown in FIG. 1) to a holder of a first BMCT when a request is made to freeze, lock, or burn (i.e., destroy) the first BMCT. In this manner, exchanging/locking the first BMCT may not terminate the game, but rather may continue the user engagement (possibly with diminishing returns for each subsequent exchange/lock). The digital image associated with the subsequent BMCT 90 may be identical to the original/pre-evolved version of the first BMCT. Alternatively, the second BMCT may have one or more qualities that help visually distinguish it from the first BMCT (e.g., color, character, style, etc).

Silhouette and Skins

Figure 4:
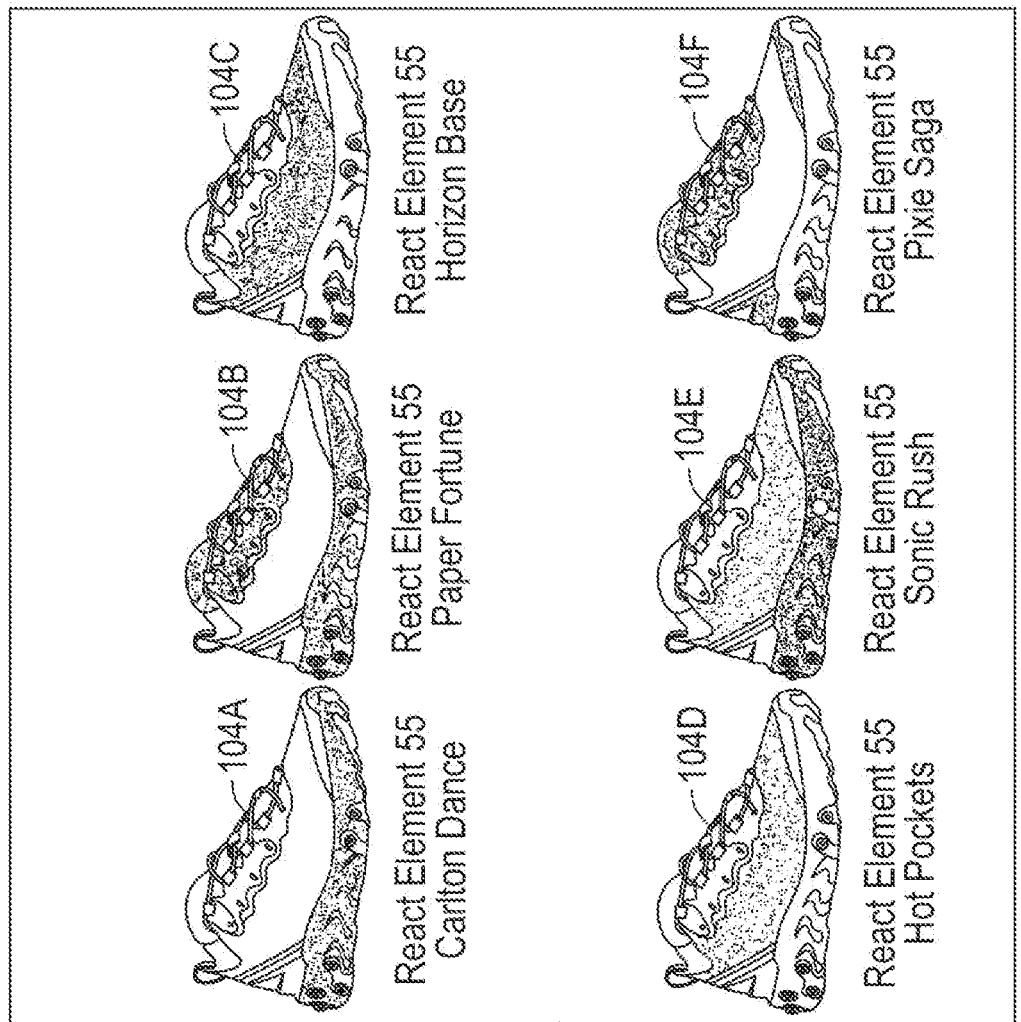
FIG. 4 is a schematic diagram of the merger of a base article with an outcome-uncertain skin vial sub-asset to yield any of six different outcomes.
Figure 4:
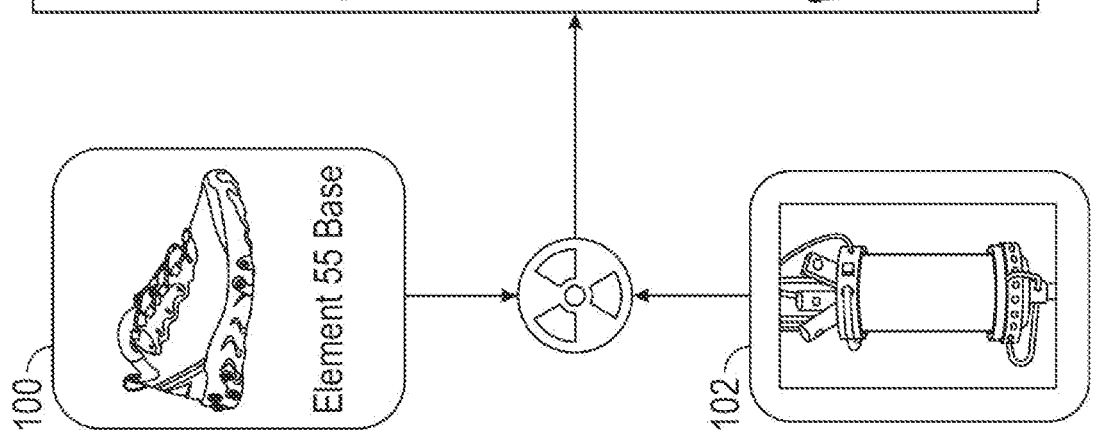

In one configuration, exchanging or locking the originally distributed BMCT may result in the token holder receiving a new BMCT or UCT that includes a digital image resembling a silhouette or other base-level version of an article, such as shown at 100 in FIG. 4. In some embodiments, this article may be an article of footwear, an article of apparel, a vehicle, a tool, or other similar articles. Additionally or alternatively, the token holder may receive one or more UCTs that represent sub-assets, skins, or skin vials 102 that can be applied to the silhouette. Such sub-assets may comprise, for example, unique colors, textures, patters, digital functionality (e.g., when imported into a video game), embellishments, backgrounds, animations, features, visual overlays, or the like. In some embodiments, the skin vials may represent a plurality of potential skins or combinations of attributes. For example, as shown in FIG. 4, the combination of the base-level article 100 and the skin vial 102 may result in any one of the six illustrated outcomes 104A, 104B, 104C, 104D, 104E, or 104F.

Once obtained (either through the original exchange or through subsequent independent purchases), the token holder may submit a request to combine one or more of the sub assets with the silhouette/base version to create a unique or upgraded version of the base article. In some embodiments, combining a skin vial (or similar item that does not outwardly define the end result) with the base-level version of the article may result in a final skinned version of the article that only finally reveals itself to the user following the combination.

Figure 5:
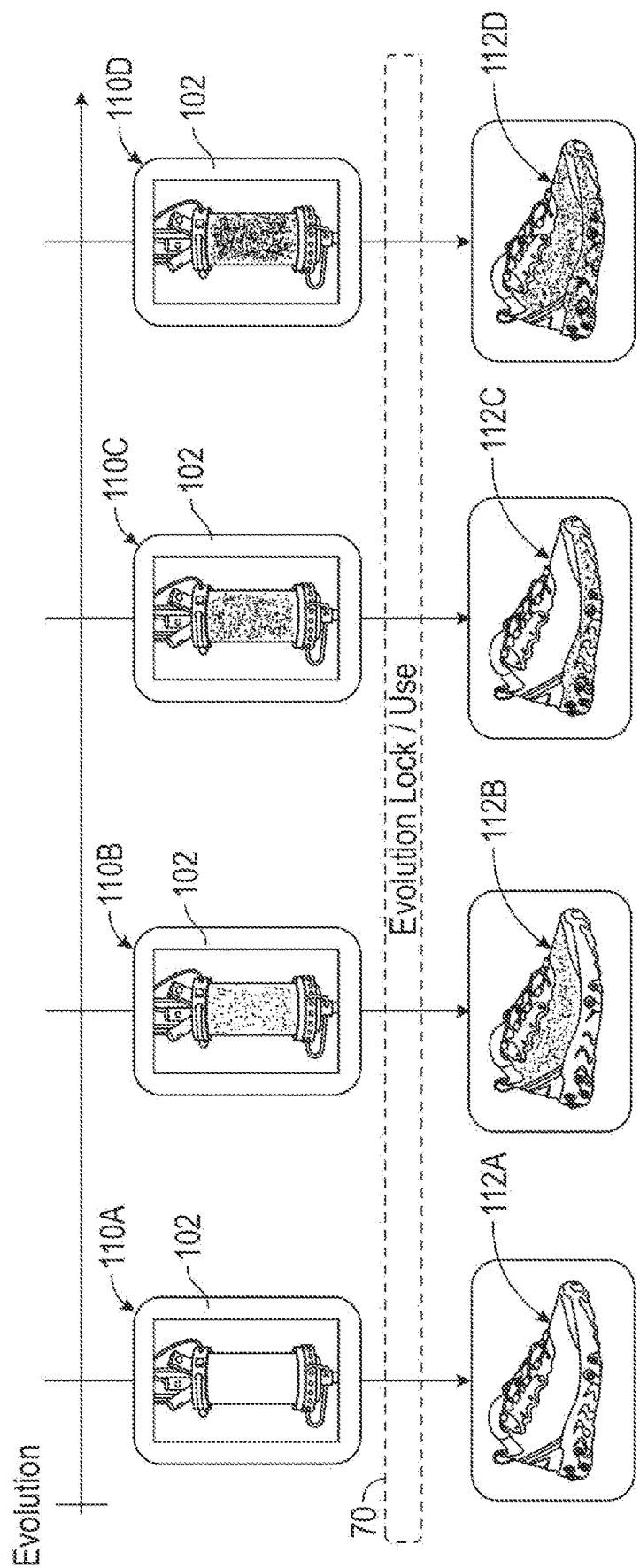
FIG. 5 is a schematic evolution progression for an outcome-uncertain skin vial sub-asset to yield different outcomes following use/merger with a base asset, where the outcome is at least partially dependent on the evolutionary state of the evolving sub-asset.

As generally illustrated in FIG. 5, in some configurations, the sub-asset (e.g., skin vial 102) may be adapted to dynamically evolve in a similar way as the BMCT discussed with respect to FIGS. 1-2. In this embodiment, evolution of the skin vial 102 may largely occur in a non-visual manner, however minor visual attributes may also be modified to express that an evolution is occurring. As shown in FIG. 5, as the skin vial evolves through a plurality of evolutionary states 110A, 110B, 110C, and 110D, the outcome of the merger with a base article 100 may result in different corresponding visual representations 112A, 112B, 112C, and 112D (i.e., the skin may take on different characteristics or visual appearances that are at least partially drawn or derived from the evolutionary state at the time when the merger/use occurred.

Such a combination of base assets and skins may be performed within a predefined digital/computing environment that may link and combine these assets without any modification to the underlying token. In this configuration, the linking of assets may rely on, for example, a database registration or cross-reference mechanism. In another embodiment, the linking/combination may involve annotating the metadata of the primary asset to reference the UCT representing the sub asset, such as described in U.S. patent application Ser. No. 17/701,237.

In some configurations, multiple UCT sub-assets may be applied to a single base silhouette to create a unique combination or cross-breed between skin styles. In this configuration, an associated server, digital engine, or virtual environment may make a generative combination of the sub-assets so that each is represented on the silhouette in a complimentary manner. Such a combination may be created in such a manner to follow one or more pre-defined style guidelines or rules that may govern potential mergers. Alternatively, the combination may rely on machine learning models to create a design from the provided skins that follows patterns drawn from a pre-defined product portfolio. For example, in the example of a shoe, the machine learning model may be trained on a particular manufacturer's historical product releases/designs to understand how the skins may be best be combined while adhering to the manufacturer's established design language for that silhouette.

Figure 6:
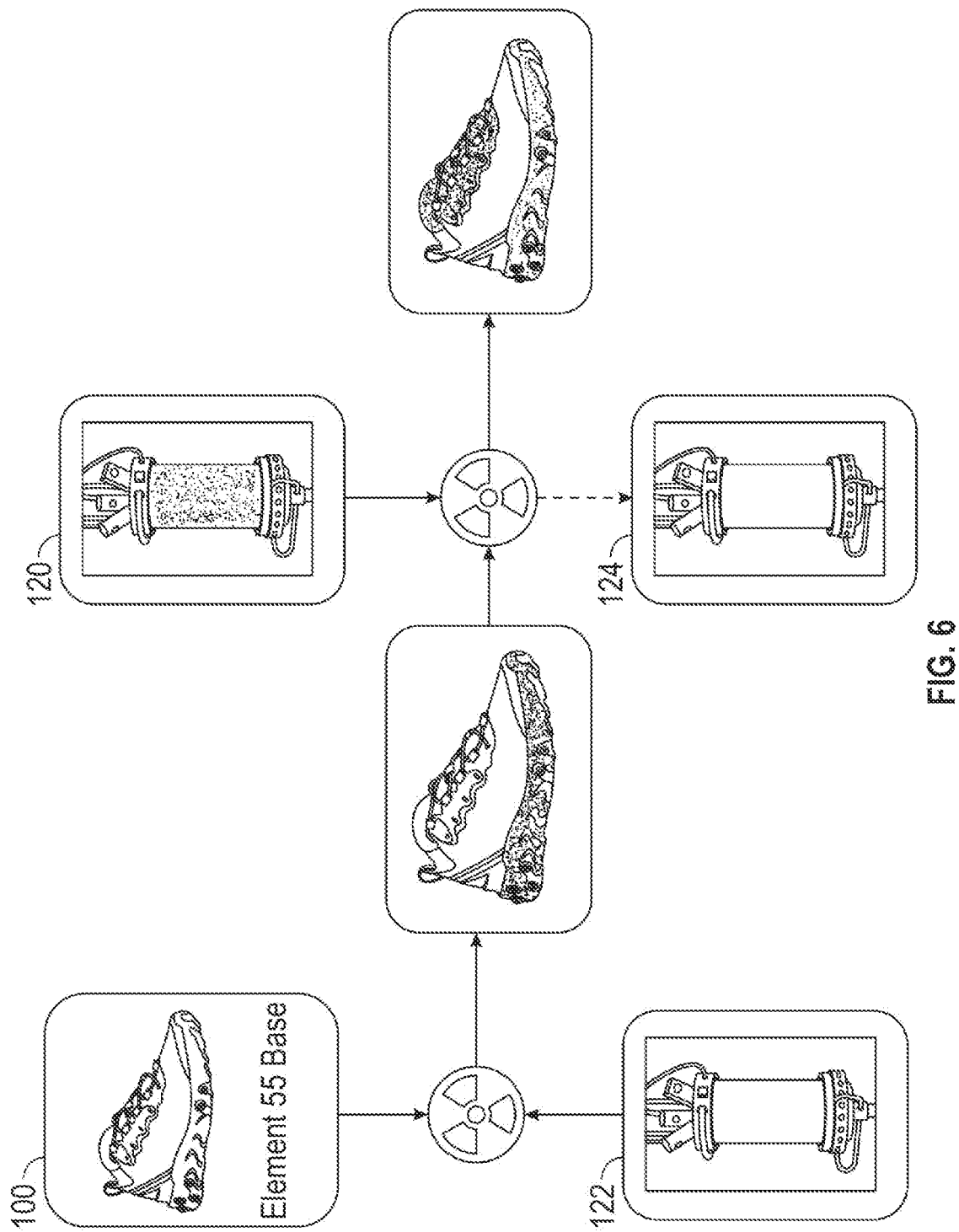
FIG. 6 is a schematic flow diagram of the merger of a second outcome-uncertain skin vial sub-asset with a previously skinned base asset to yield a newly skinned base asset and a newly minted skin vial.

As shown in FIG. 6, instead of creating a generative merger of skins, in some embodiments, a second or subsequently applied skin vial 120 may operatively re-skin the base article 100, which was previously skinned by a first skin vial 122. In some configurations, this re-skinning may result in a third skin vial 124 being minted and returned to the user as if it is the originally applied skin being removed from the article. This third skin vial 124 may be equivalent or substantially identical to the first skin vial 122, and if the skin vials are embodied as BMCTs, the third skin vial 124 may even be minted from the same contract used to create the first skin vial 122.

Figure 7A:
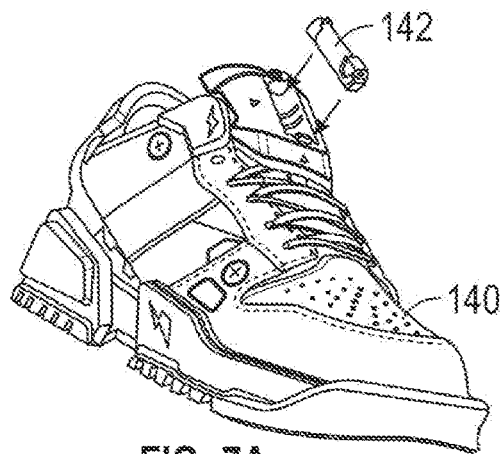
FIG. 7A is a schematic graphical display image providing perspective view of a digital skin vial sub-asset being integrated into a base-level version of a digital collectable.
Figure 7B:
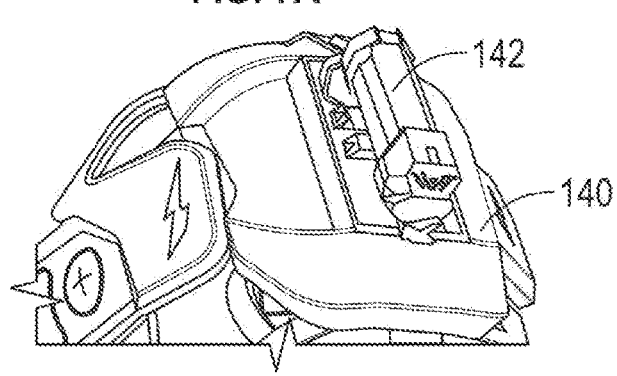
FIG. 7B is a schematic graphical display image showing an enlarged view of the vial of FIG. 7A being inserted into the digital collectable of FIG. 7A.
Figure 7C:
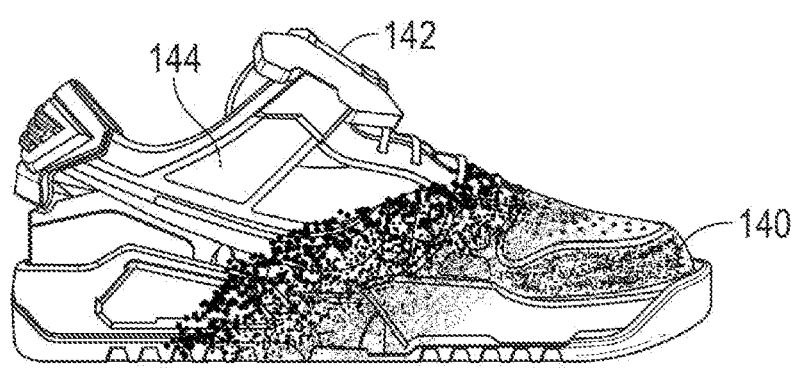
FIG. 7C is a schematic graphical display image providing side view of a digital skin sweeping across the base-level version of the digital collectable.
Figure 7D:
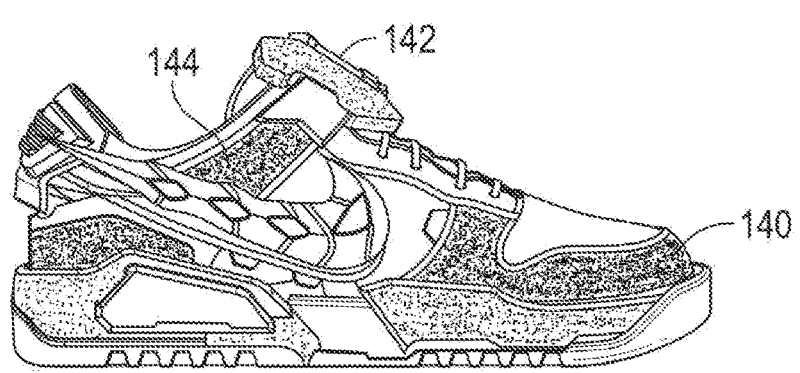
FIG. 7D is a schematic graphical display of the digital collectable of FIG. 7C with the digital skin fully applied.

FIGS. 7A-7D schematically illustrate an embodiment of the graphical merger of a primary asset (e.g., a base version of a shoe 140) and a sub-asset (e.g., a digital skin vial 142). As discussed above, during the merger, the token embodying the vial 142 may either be burned, transferred to a burn wallet, or else nested into the code of the primary asset (e.g., via a nested reference to the sub-asset token). Regardless of what happens at a token level, in one configuration, the graphical representation of the vial may be merged into the graphical representation of the more senior asset (i.e., the shoe). Further as illustrated, the skin 144 resulting from the vial may also be applied to the shoe (potentially by sweeping across the shoe as generally illustrated in FIG. 7C). Such a merger may be displayed to a user via the server that operatively combines the assets, and in some embodiments the server may further alter the graphics file of the primary asset to include the sub asset. In some embodiments, to facilitate easier de-skinning, the sub asset may be applied in a masking layer over top of the existing shoe graphic (which may be maintained in an unaltered form in a base layer of the image). In embodiments where the sub-asset is burned or sent to a burn wallet, the graphical representation of the skin and/or vial may be saved to the file repository by the server and the merged combination of graphics may either be integrated (or instructed to be written) into the metadata of the primary asset, may overwrite the existing graphics file, or may be privately maintained as a merged asset by the server.

As noted above, in some embodiments, a user may submit a request that their upgraded/skinned silhouette be made available for retail sale in a physical form. Similarly the upgraded/skinned article may be imported into a digital software application/video game, such as described generally in U.S. Pat. No. 11,308,184, which is incorporated by reference in its entirety and for all that it discloses.

It should be appreciated that the above-described technology may be capable of implementation in a variety of forms. While NFT technology is consistently referenced, the technology may be implemented through one or more public blockchains, private blockchains, and/or may incorporate one or more sidechains, smart contracts, databases, and the like.

Further, it should be appreciated that this concept of locking evolving assets and/or creating derivative assets from an evolving asset avails itself to numerous possible forms. In one particular embodiment, an evolving ERC1155 collectable may be locked/burned/exchanged for an ERC721 base article and/or one or more ERC1155 skin vials that are operative to modify an existing ERC721 base article. The ERC1155 skin vials may be configured to dynamically evolve such that applying or merging the skin vial with a base article produces different results depending on the state of evolution for the vial. Further, the vial may have a suite of potential skins that it can select from (e.g., applying the vial to the base article may force a probabilistic selection of one of, for example, eight possible skins to apply). If the vial is to evolve, then it may evolve such that each of the potential skins or skin options may also all evolve, albeit they may evolve at different rates or to different degrees. Skinning the base article with the vial may then cause the vial to be burnt or else transferred to a burn wallet maintained by the content creator for that purpose. If a subsequent vial is then attempted to be applied to the now-skinned base article, as noted above, the server may create a generative merge or progeny digital asset (such as described in U.S. Pat. No. 10,505,726, which is incorporated by reference in its entirety) based on the combination of traits, or else may extract the first vial/skin (remove the skin and remint the vial) before applying the subsequent vial.

In other configurations, locking the evolving ERC1155 collectable may result in the creation of a replica ERC721 collectable that is based on or is an exact copy of the evolving ERC1155 collectable at the time of the lock. Further, other derivative ERC721 collectables may be created/exchanged upon the lock that are derive at least one property from the evolutionary state of the evolving ERC1155 collectable, though are not identical. Finally, locking the ERC1155 collectable may result in the holder receiving one or more other evolving ERC1155 collectables in return, that then may be selectively locked in much the same way as the original ERC1155 collectable.

While the previous disclosure largely focuses on footwear, similar concepts may also apply to articles of apparel, ancillary items that may have utility in video games, commemorative trading cards, sporting tickets, concert tickets, event tickets, and the like.

This technology creates a new paradigm and use for NFT collectables, whereby a holder no longer needs to just own a picture created by another. Instead, this architecture and method of exchanging and locking NFT assets presents a gamified and interactive experience where they can participate in the design and collect and change their NFT at their own discretion. It provides end user control, brand integration, and a better and more dynamic experience to a field that has previously been plain and static.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and sub-combinations of the preceding elements and features.

The following clauses provide various and/or additional embodiments of the present technology. These clauses should be read and interpreted in light of the preceding disclosure and are intended to supplement this disclosure without limitation.

Clause 1. A method of selectively locking a cryptographic digital asset comprising: instructing or requesting the creation or minting of a plurality of first cryptographic tokens via a first common digital contract registered to a distributed ledger, wherein each cryptographic token of the plurality of cryptographic tokens defines a digital asset that includes an attribute that is operative to evolve or change through a plurality of evolutionary stages; instructing the plurality of cryptographic tokens to be transferred to a plurality of token holders; receiving a request from a token holder of the plurality of token holders to selectively lock a digital asset defined by one of the plurality of cryptographic tokens at one of the plurality of evolutionary stages; instructing or requesting the transfer of a second cryptographic token to the token holder, the second cryptographic token having at least one attribute that is at least partially derived from the evolutionary stage of the digital asset at the time of the request.

Clause 2. The method of clause 1, wherein the attribute is operative to evolve or change in response to an external triggering event.

Clause 3. The method of clause 2, wherein the external triggering event is an event that occurs in the real/physical world or within a digital/virtual environment or game environment.

Clause 4. The method of clause 2, further comprising receiving, via a blockchain oracle, an indication that the external triggering event has occurred; and altering the attribute in response to the indication that the external triggering event has occurred.

Clause 5. The method of any of clauses 1-4, wherein the attribute is an element of a graphical representation of the digital asset or a discrete alphanumeric identifier.

Clause 6. The method of any of clauses 1-5, wherein the request from the token holder to selectively lock the digital asset comprises a request to exchange the first cryptographic token for the second cryptographic token.

Clause 7. The method of any of clauses 1-6, further comprising receiving an indication of a location of the token holder; and wherein the instructing or requesting of the transfer of a second cryptographic token to the token holder occurs only if the location of the token holder is within a predefined distance of a predefined location.

Clause 8. The method of clause 7, further comprising: receiving a request from a second token holder of the plurality of token holders to selectively lock a digital asset defined by one of the plurality of cryptographic tokens at one of the plurality of evolutionary stages; receiving an indication of a location of the token holder, wherein the location of the token holder is within the predefined distance of the predefined location, and wherein the location of the second token holder is not within the predefined distance of the predefined location; instructing or requesting the transfer of a third cryptographic token to the second token holder, the third cryptographic token having at least one attribute that is at least partially derived from the evolutionary stage of the digital asset at the time of the request; and wherein the second cryptographic token and the third cryptographic token have at least one attribute that is different.

Clause 9. The method of any of clauses 1-8, further comprising instructing or requesting the first cryptographic token be burned or transferred to a burn wallet following the instructing or requesting of the transfer of the second cryptographic token to the token holder.

Clause 10. The method of any of clauses 1-9, wherein the second cryptographic token is representative of a sub asset or skin; and wherein the sub asset or skin may be combined with a primary digital asset to alter an attribute of the primary digital asset.

Clause 11. The method of any of clauses 1-10, wherein the plurality of first cryptographic tokens are ERC1155 tokens that are created according to Ethereum Improvement Proposal EIP-1155, and the second cryptographic token is an ERC721 token that is created according to Ethereum Improvement Proposal EIP-721.

Clause 12. A method for managing digital assets represented by cryptographic tokens comprising: instructing or requesting the creation or minting of a plurality of initial cryptographic tokens via a first common digital contract registered on a distributed ledger, each token representing a digital asset with at least one attribute capable of evolving through a plurality of evolutionary stages; distributing the plurality of initial cryptographic tokens to a plurality of token holders; monitoring one or more external triggering events that can influence the evolution of the at least one attribute; updating the at least one attribute of the digital assets in response to the external triggering events; receiving a locking request from a token holder to selectively lock a digital asset defined by one of the initial cryptographic tokens at a specific evolutionary stage; instructing or requesting the creation or minting of a subsequent cryptographic token that captures the state of the digital asset at the specific evolutionary stage; and instructing or requesting the transfer of the subsequent cryptographic token to a digital wallet or account of the requesting token holder.

Clause 13. The method of clause 12, wherein the external triggering events are events occurring in the physical world, digital or virtual environments, or videogame environments.

Clause 14. The method of any of clauses 12-13, wherein the monitoring of one or more external triggering events comprises receiving an input from a blockchain oracle to verify and process the occurrence of the external triggering events.

Clause 15. The method of any of clauses 12-14, wherein the at least one attribute of the digital assets includes a visual or graphical representation, an alphanumeric identifier, or a combination thereof.

Clause 16. The method of any of clauses 12-15, wherein the locking request from the token holder comprises a request to exchange the initial cryptographic token for the subsequent cryptographic token.

Clause 17. The method of any of clauses 12-16, further comprising: receiving an indication of a location of the token holder concomitantly with the receiving of the locking request; and applying geographical restrictions on the transfer of the subsequent cryptographic token based on the location of the token holder relative to a predefined location.

Clause 18. The method of any of clauses 12-17, further comprising retiring the initial cryptographic token by transferring it to a burn wallet or marking it as inactive after the transfer of the subsequent cryptographic token to the requesting token holder.

Clause 19. The method of any of clauses 12-18, wherein the subsequent cryptographic token represents a digital sub-asset or digital asset modifier that can be combined with a primary digital asset to modify one or more attributes of the primary digital asset.

Clause 20. The method of any of clauses 12-19, wherein the plurality of initial cryptographic tokens are ERC1155 tokens that are created according to Ethereum Improvement Proposal EIP-1155, and the subsequent cryptographic token is an ERC721 token that is created according to Ethereum Improvement Proposal EIP-721.

Clause 21. An electronic computing system configured to perform the method of any of clauses 1-20.

The invention claimed is:
1. A method of selectively locking a cryptographic digital asset comprising:

instructing the creation or minting of a plurality of first cryptographic tokens via a first common digital contract registered to a distributed ledger, wherein each cryptographic token of the plurality of cryptographic tokens defines a digital asset that includes an attribute that is operative to evolve or change through a plurality of evolutionary stages;

instructing the plurality of cryptographic tokens to be transferred to a plurality of token holders;

receiving a request from a token holder of the plurality of token holders to selectively lock a digital asset defined by one of the plurality of cryptographic tokens at one of the plurality of evolutionary stages;

instructing the transfer of a second cryptographic token to the token holder, the second cryptographic token having at least one attribute that is at least partially derived from the evolutionary stage of the digital asset at the time of the request.

2. The method of claim 1, wherein the attribute is operative to evolve or change in response to an external triggering event.

3. The method of claim 2, wherein the external triggering event is an event that occurs in the real/physical world or within a digital/virtual environment or game environment.

4. The method of claim 2, further comprising receiving, via a blockchain oracle, an indication that the external triggering event has occurred; and altering the attribute in response to the indication that the external triggering event has occurred.

5. The method of claim 1, wherein the attribute is an element of a graphical representation of the digital asset or a discrete alphanumeric identifier.

6. The method of claim 1, wherein the request from the token holder to selectively lock the digital asset comprises a request to exchange the first cryptographic token for the second cryptographic token.

7. The method of claim 1, further comprising receiving an indication of a location of the token holder; and wherein the instructing of the transfer of a second cryptographic token to the token holder occurs only if the location of the token holder is within a predefined distance of a predefined location.

8. The method of claim 7, further comprising:

receiving a request from a second token holder of the plurality of token holders to selectively lock a digital asset defined by one of the plurality of cryptographic tokens at one of the plurality of evolutionary stages;

receiving an indication of a location of the token holder, wherein the location of the token holder is within the predefined distance of the predefined location, and wherein the location of the second token holder is not within the predefined distance of the predefined location;

instructing the transfer of a third cryptographic token to the second token holder, the third cryptographic token having at least one attribute that is at least partially derived from the evolutionary stage of the digital asset at the time of the request; and wherein the second cryptographic token and the third cryptographic token have at least one attribute that is different.

9. The method of claim 1, further comprising instructing the first cryptographic token be burned or transferred to a burn wallet following the instructing of the transfer of the second cryptographic token to the token holder.

10. The method of claim 1, wherein the second cryptographic token is representative of a sub asset or skin; and wherein the sub asset or skin may be combined with a primary digital asset to alter an attribute of the primary digital asset.

11. The method of claim 1, wherein the plurality of first cryptographic tokens are ERC1155 tokens that are created according to Ethereum Improvement Proposal EIP-1155, and the second cryptographic token is an ERC721 token that is created according to Ethereum Improvement Proposal EIP-721.

12. A method for managing digital assets represented by cryptographic tokens comprising:

instructing the creation or minting of a plurality of initial cryptographic tokens via a first common digital contract registered on a distributed ledger, each token representing a digital asset with at least one attribute capable of evolving through a plurality of evolutionary stages;

distributing the plurality of initial cryptographic tokens to a plurality of token holders;

monitoring one or more external triggering events that can influence the evolution of the at least one attribute;

evolving the at least one attribute of the digital asset to a subsequent one of the plurality of evolutionary stages in response to the one or more external triggering events;

receiving a locking request from a token holder to selectively lock a digital asset defined by one of the initial cryptographic tokens at a specific evolutionary stage;

instructing the creation or minting of a subsequent cryptographic token that captures the state of the digital asset at the specific evolutionary stage; and instructing the transfer of the subsequent cryptographic token to a digital wallet or account of the requesting token holder.

13. The method of claim 12, wherein the external triggering events are events occurring in the physical world, digital or virtual environments, or videogame environments.

14. The method of claim 12, wherein the monitoring of one or more external triggering events comprises receiving an input from a blockchain oracle to verify and process the occurrence of the external triggering events.

15. The method of claim 12, wherein the at least one attribute of the digital assets includes a visual or graphical representation, an alphanumeric identifier, or a combination thereof.

16. The method of claim 12, wherein the locking request from the token holder comprises a request to exchange the initial cryptographic token for the subsequent cryptographic token.

17. The method of claim 12, further comprising:

receiving an indication of a location of the token holder concomitantly with the receiving of the locking request; and applying geographical restrictions on the transfer of the subsequent cryptographic token based on the location of the token holder relative to a predefined location.

18. The method of claim 12, further comprising retiring the initial cryptographic token by transferring it to a burn wallet or marking it as inactive after the transfer of the subsequent cryptographic token to the requesting token holder.

19. The method of claim 12, wherein the subsequent cryptographic token represents a digital sub-asset or digital asset modifier that can be combined with a primary digital asset to modify one or more attributes of the primary digital asset.

20. The method of claim 12, wherein the plurality of initial cryptographic tokens are ERC1155 tokens that are created according to Ethereum Improvement Proposal EIP-1155, and the subsequent cryptographic token is an ERC721 token that is created according to Ethereum Improvement Proposal EIP-721.

* * * * *